United States Patent
Fujii

(10) Patent No.: US 9,764,373 B2
(45) Date of Patent: Sep. 19, 2017

(54) WORKPIECE CONVEYING DEVICE

(71) Applicant: HITACHI ZOSEN FUKUI CORPORATION, Awara-shi, Fukui (JP)

(72) Inventor: Syoichiro Fujii, Awara (JP)

(73) Assignee: HITACHI ZOSEN FUKUI CORPORATION, Awara-shi, Fukui (JP)

( * ) Notice: Subject to any disclaimer, the term of this patent is extended or adjusted under 35 U.S.C. 154(b) by 177 days.

(21) Appl. No.: 14/437,108

(22) PCT Filed: Oct. 23, 2013

(86) PCT No.: PCT/JP2013/006274
§ 371 (c)(1),
(2) Date: Apr. 20, 2015

(87) PCT Pub. No.: WO2014/064937
PCT Pub. Date: May 1, 2014

(65) Prior Publication Data
US 2015/0283596 A1    Oct. 8, 2015

(30) Foreign Application Priority Data

Oct. 23, 2012    (JP) .................................. 2012-234222

(51) Int. Cl.
*B21D 43/04*   (2006.01)
*B21D 43/05*   (2006.01)
*B25J 9/10*    (2006.01)

(52) U.S. Cl.
CPC ............. *B21D 43/05* (2013.01); *B21D 43/04* (2013.01); *B25J 9/106* (2013.01)

(58) Field of Classification Search
CPC ... B25J 9/04; B25J 9/041; B25J 9/1065; B25J 18/005; B25J 9/106; B60G 2200/3415;
(Continued)

(56) References Cited

U.S. PATENT DOCUMENTS

2005/0166659 A1*  8/2005  Baba .................. B21D 43/05
                                                    72/405.09

FOREIGN PATENT DOCUMENTS

JP    S61-4828 U     1/1986
JP    S61-190322 U   11/1986
(Continued)

OTHER PUBLICATIONS

International Search Report of PCT/JP2013/006274 mailed Jan. 28, 2014 and an English translation thereof.

*Primary Examiner* — Michael McCullough
*Assistant Examiner* — Brendan Tighe
(74) *Attorney, Agent, or Firm* — Muncy, Geissler, Olds & Lowe, P.C.

(57) ABSTRACT

It is a subject to provide a workpiece conveying device capable of linearly conveying a workpiece with a lightweight and simple configuration. The present invention is a workpiece conveying device 100 for conveying a workpiece W, the workpiece conveying device 100 comprising a main body portion 10; a rail portion 1 mounted to an upper portion of the main body portion 10; a guide portion 1a slidable along the rail portion 1; an arm 3 in which a first pivotally attaching portion 3b at the upper end thereof is pivotally attached to the guide portion 1a; a holding means 4 which is mounted to a second shall 3a at a lower end of the arm 3 and which can hold the workpiece W; an auxiliary arm 20 mounted to a first shaft 2b of the main body portion 10 to be rotatable; a slider portion 2a slidable along the auxiliary arm 20; and servomotors for driving the auxiliary arm 20, wherein a second pivotally attaching portion 3c at approximately a center of the arm 3 is pivotally attached to the slider portion 2a.

5 Claims, 11 Drawing Sheets

(58) Field of Classification Search
CPC .. F16H 21/44; Y10S 901/25; Y10T 74/18888;
Y10T 74/18912; Y10T 74/1892; Y10T
74/18928; Y10T 74/18936; Y10T
74/18944; B21D 43/04; B21D 43/05
USPC .......... 74/103, 89.32, 89.33, 424.72, 490.03;
414/744.3, 744.6, 752.1, 917; 901/17;
33/89.32, 89.33, 424.72, 490.03
See application file for complete search history.

(56) References Cited

FOREIGN PATENT DOCUMENTS

| | | | |
|---|---|---|---|
| JP | 2004216451 | A | 8/2004 |
| JP | 2005118887 | A | 5/2005 |
| JP | 2005161406 | A | 6/2005 |
| JP | 2005246460 | A | 9/2005 |
| JP | 2010-94695 | A | 4/2010 |
| JP | 2011-125881 | A | 6/2011 |

* cited by examiner

WORKPIECE CONVEYING DEVICE

CROSS REFERENCE TO RELATED APPLICATIONS

This application is a national stage of International Application No. PCT/JP2013/006274, which was filed on Oct. 23, 2013, and which claims priority to JP 2012-234222 which was filed on Oct. 23, 2012, and which are both herein incorporated by reference.

TECHNICAL FIELD

The present invention relates to a workpiece conveying device, and more particularly to a workpiece device capable of linearly conveying a workpiece with a light-weight and simply configuration.

BACKGROUND ART

Workpiece conveying devices are used for conveying workpieces in tandem press lines for successively pressing workpieces.

There are various workpiece conveying devices of robot style provided with arms.

For instance, there is known a workpiece conveying device comprising a beam built between adjoining press machines, a carrier provided to be freely movable along the beam, a cradle table supported by the carrier and being driven to swing along a workpiece conveying direction, and a crossbar suspending and supporting a workpiece via vacuum cups holding the workpiece in a freely detachable manner, wherein a relative distance between a swing center of the cradle table and the crossbar is arranged to be variable by providing a field lever at the cradle table via a linear moving mechanism (see, for instance, Patent Literatures 2 and 3).

Further, there is known a workpiece conveying device comprising a workpiece holding means which holds a workpiece, a carrier disposed between adjoining presses and being linearly movable in a direction orthogonal to a workpiece conveying direction by means of a driving mechanism, and a swinging body which central axis of swinging is provided at the carrier and which is driven to swing along the work conveying direction by means of a swinging mechanism (for instance, Patent Literature 4).

In this workpiece conveying device, there is provided a so-called Scott Russell mechanism in which an inter-axial distance of both ends of a second link is defined to be half of an inter-axial distance of both ends of a first link, and in which one end of the second link is coupled to a center of the axis interval of both ends of the first link while the other end of the second link is positioned on an extension of a moving line of another end of the first link.

CITATION LIST

Patent Literature

PTL 1: Japanese Patent Application Laid-Open No. 2004-216451
PTL 2: Japanese Patent Application Laid-Open No. 2005-118887
PTL 3: Japanese Patent Application Laid-Open No. 2005-161406
PTL 4: Japanese Patent Application Laid-Open No. 2005-246460

SUMMARY OF INVENTION

Technical Problem

In the workpiece conveying devices recited in the above Patent Literatures 1 to 3, while the relative distance between the center of the rotation supporting axis and the crossbar is varied via the linear moving mechanism, there is a drawback in that complicated adjustments are necessary for linearly conveying a workpiece.

Moreover, since the linear moving mechanism is of large weight, large load is applied to the device due to inertial force and other factors when the carrier is moved along the beam or when the cradle table is rotated which might cause a breakdown.

Further, due to its large weight, it is not quite superior in energy efficiency.

In the workpiece conveying device recited in the above Patent Literature 4, there is a drawback in that the device becomes excessively large because it requires a lift driving means which drives a supporting member in the vertical direction in addition to the driving means which drives the first link and the second link.

The present invention has been made in view of the above circumstances, and it is an object thereof to provide a workpiece conveying device capable of linearly conveying a workpiece with a light-weight and simply configuration.

Solution to Problems

By performing earnest considerations for solving the above problems, the inventors of the present invention have found that the above problem can be solved by making the arm to be slidable along a rail portion via a guide portion and further by making a slider portion to which the arm is pivotally attached to be slidable along an auxiliary arm, and have come to complete the present invention.

The present invention resides (1) in a workpiece conveying device for conveying a workpiece, the workpiece conveying device comprising a main body portion; a rail portion provided to extend at an upper portion of the main body portion; a guide portion slidable along the rail portion; an arm which upper end is pivotally attached to the guide portion by means of a first pivotally attaching portion; a holding means which is mounted to a second shaft at a lower end of the arm and which can hold the workpiece; an auxiliary arm mounted to a first shaft of the main body portion to be rotatable; and a slider portion slidable along the auxiliary arm, wherein approximately a center of the arm is pivotally attached to the slider portion by means of a second pivotally attaching portion.

The present invention resides (2) in the workpiece conveying device according to above (1) wherein the second pivotally attaching portion is provided closer to the first pivotally attaching portion side than a central portion with respect to a longitudinal direction of the arm.

The present invention resides (3) in the workpiece conveying device according to above (1) or (2) wherein a ratio of a distance from the first pivotally attaching portion to the second pivotally attaching portion and a distance from the second shaft to the second pivotally attaching portion is 1:1.2 to 2.

The present invention resides (4) in the workpiece conveying device according to any one of above (1) to (3)

wherein a ratio of a distance from the first shaft to the second pivotally attaching portion and a distance from the first pivotally attaching portion to the second shaft is 1:2 to 4.

The present invention resides (5) in the workpiece conveying device according to any one of above (1) to (4) wherein a belt portion which slides along a longitudinal direction of the auxiliary arm is extended at the auxiliary arm, and wherein the slider portion is fixed at the belt portion.

The present invention resides (6) in the workpiece conveying device according to any one of above (1) to (5) wherein all of rotation of the holding means, rotation of the auxiliary arm and sliding of the slider portion is performed by driving a servomotor.

The present invention resides (7) in the workpiece conveying device according to any one of above (1) to (6) wherein the holding means is comprised of a crossbar connected to the arm and suction portions mounted to the crossbar.

The present invention resides (8) in the workpiece conveying device according to any one of above (1) to (7) which is used as a device carrying a workpiece in and out with respect to a press machine and which is mounted to a post of the press machine.

Advantageous Effects of Invention

In the workpiece conveying device of the present invention, it is possible to adjust heights of workpieces at the time of conveying workpieces by sliding the guide portion to which the arm is mounted along the rail portion. With this arrangement, it is possible to convey a workpiece linearly.

Further, in the workpiece conveying device, by sliding the slider portion to which the arm is pivotally attached at the second pivotally attaching portion along the auxiliary arm, the auxiliary arm can support the arm without interfering linear conveyance of a workpiece. With this arrangement, it is possible to linearly convey also a workpiece of relatively large weight.

Moreover, since the workpiece conveying device is of simple and light-weight configuration, it is superior in energy efficiency, installation thereof easy, and it requires no space.

In the workpiece conveying device of the present invention, the device can be made compact since the second pivotally attaching portion is provided closer to the first pivotally attaching portion side than the central position with respect to the longitudinal direction of the arm. Particularly, the device can be made more compact when the ratio of the distance from the first pivotally attaching portion to the second pivotally attaching portion and the distance from the second shaft to the second pivotally attaching portion is 1:1.2 to 2, and it is also possible to reduce energy costs necessary for conveyance.

The size of the device can be made more compact when the ratio of the distance from the first shaft to the second pivotally attaching portion and the distance from the first pivotally attaching portion to the second shaft is 1:2 to 4.

In the workpiece conveying device of the present invention, the belt portion which slides along the longitudinal direction of the auxiliary arm is extended at the auxiliary arm, and when the slider portion is fixed at the belt portion, the belt portion slides in a state in which the slider portion is supported at the belt portion, and it can endure larger weight loads.

In the workpiece conveying device of the present invention, when all of rotation of the holding means, rotation of the auxiliary arm and sliding of the slider portion is performed by driving servomotors, it is possible to perform control at high accuracy, and since no space is required, the configuration might be simpler when compared to other driving sources.

In the workpiece conveying device of the present invention, when the holding means is comprised of the crossbar connected to the arm and the suction portions mounted to the crossbar, it is possible to suck and hold a workpiece also in case it is of a relatively large workpiece.

The workpiece conveying device of the present invention can be used as a device carrying a workpiece in and out with respect to a press machine by attaching the same to a post of the press machine. In case of a tandem press line, the entire line can be made compact.

Since the workpiece can be conveyed linearly, it is possible to carry the workpiece in and out quickly and efficiently.

DESCRIPTION OF EMBODIMENTS

Figure 1:
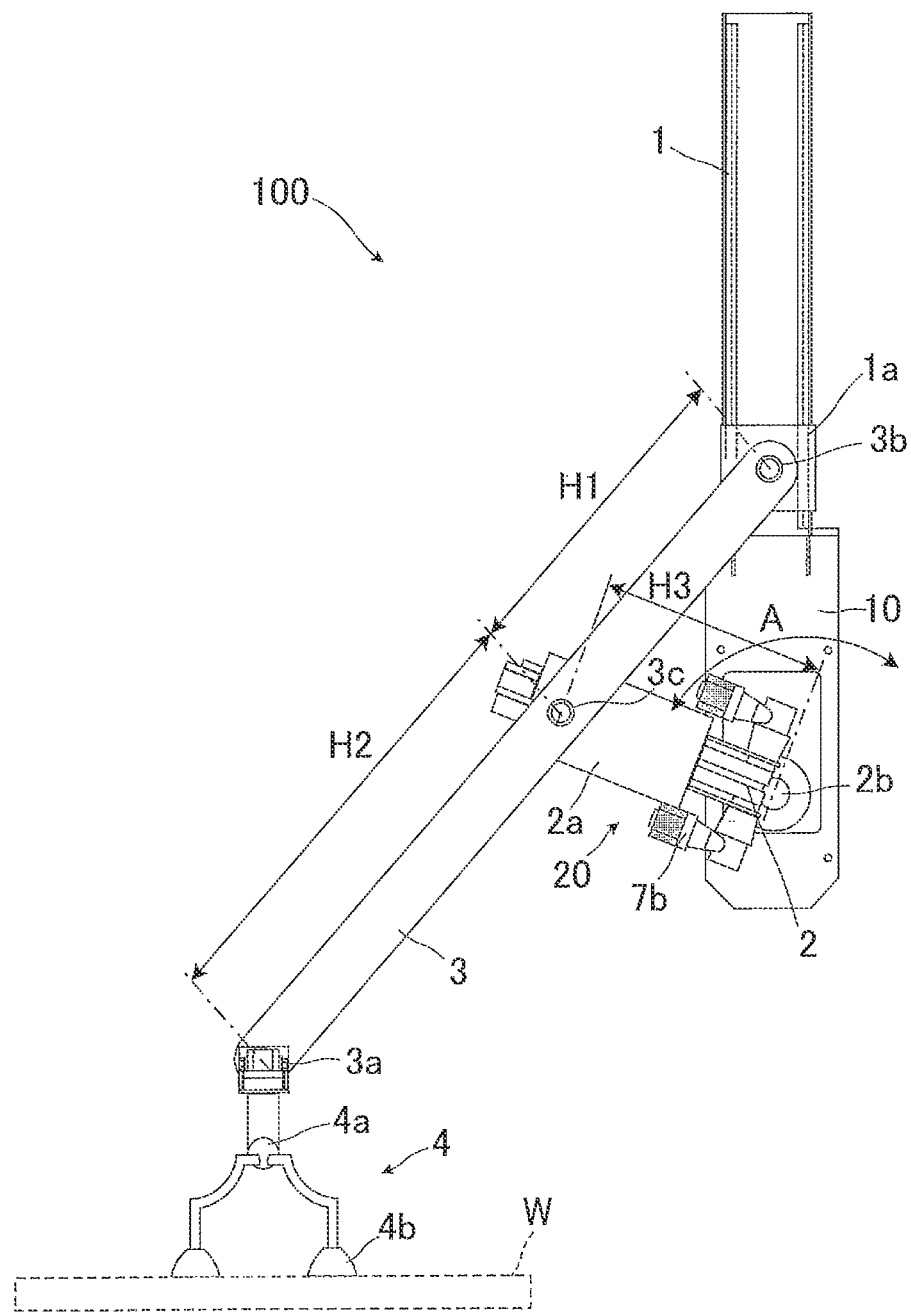
FIG. 1 is a front view showing one example of a workpiece conveying device according to the present embodiment.

Preferred embodiments of the present invention will be explained in details hereinbelow with reference to drawings as necessary. In this respect, identical elements are marked with identical reference signs, and duplicated explanations will be omitted. Further, unless specified otherwise, positional relationships of top and bottom or right and left are based on the positional relationships as shown in the drawings. Moreover, dimensional ratios of the drawings are not limited to the illustrated ratios.

FIG. 1 is a front view showing one example of a workpiece conveying device according to the present embodiment.

As shown in FIG. 1, the workpiece conveying device 100 according to the present embodiment comprises a main body portion 10; a rail portion 1 provided to extend at an upper portion of the main body portion 10; a guide portion 1a slidable along the rail portion 1; an arm 3 which upper end is pivotally attached to the guide portion 1a by means of a first pivotally attaching portion 3b; a holding means 4 which is mounted to a second shaft 3a at a lower end of the arm 3 and which can hold a workpiece W; an auxiliary arm 20 mounted to a first shaft 2b of the main body portion 10 to be rotatable; and a slider portion 2a slidable along the auxiliary arm 20.

The slider portion 2a is pivotally attached to approximately the center of the arm 3 by means of a second pivotally attaching portion 3c.

In this manner, the workpiece conveying device 100 is of light-weight and simple configuration.

In the workpiece conveying device 100, the workpiece W is conveyed by holding the workpiece W by means of the holding means 4 and by rotating the arm 3 to which the holding means 4 is mounted at the first pivotally attaching portion 3b.

At this time, the guide portion in pivotally attached to the arm 3 by means of the first pivotally attaching portion 3b slides along the rail portion 1 in the vertical direction, and simultaneously therewith, the slider portion 2a pivotally attached to approximately the center of the arm 3 by means of the second pivotally attaching portion 3c slides in the longitudinal direction of the auxiliary arm 20. In this respect, details of these movements will be described later. With this arrangement, it is possible to reliably hold the workpiece W while the workpiece W can be conveyed linearly with a compact configuration.

The workpiece conveying device 100 will hereinafter be explained in further details.

In the workpiece conveying device 100, the rail portion 1 extending linearly in the longitudinal direction (vertical direction) of the main body portion 10 is provided to extend at an upper portion of the main body portion 10, and the guide portion 1a is mounted to the rail portion 1 to be freely slidable in the vertical direction along the rail portion 1.

The guide portion 1a is pivotally attached to the upper end of the arm 3 by means of the first pivotally attaching portion 3b.

Accordingly, the upper end of the arm 3 slides in the vertical direction along the rail portion 1 integrally with the guide portion 1a. With this arrangement, it is possible to adjust heights of workpieces W at the time of conveying workpieces W.

The auxiliary arm 20 is mounted to the main body portion 10 in a rotatable manner.

Here, the auxiliary arm 20 is mounted to the main body portion 10 just below the rail portion 1 and being apart therefrom by a certain distance. With this arrangement, it is possible to make the auxiliary arm 20 more compact and to reduce the moving distance of the slider portion 2 at the time of conveying a workpiece. Namely, it is possible to make the slider portion 2a smoothly follow movements of the arm 3 while movements of the slider portion 2a itself are relatively limited.

Figure 2:
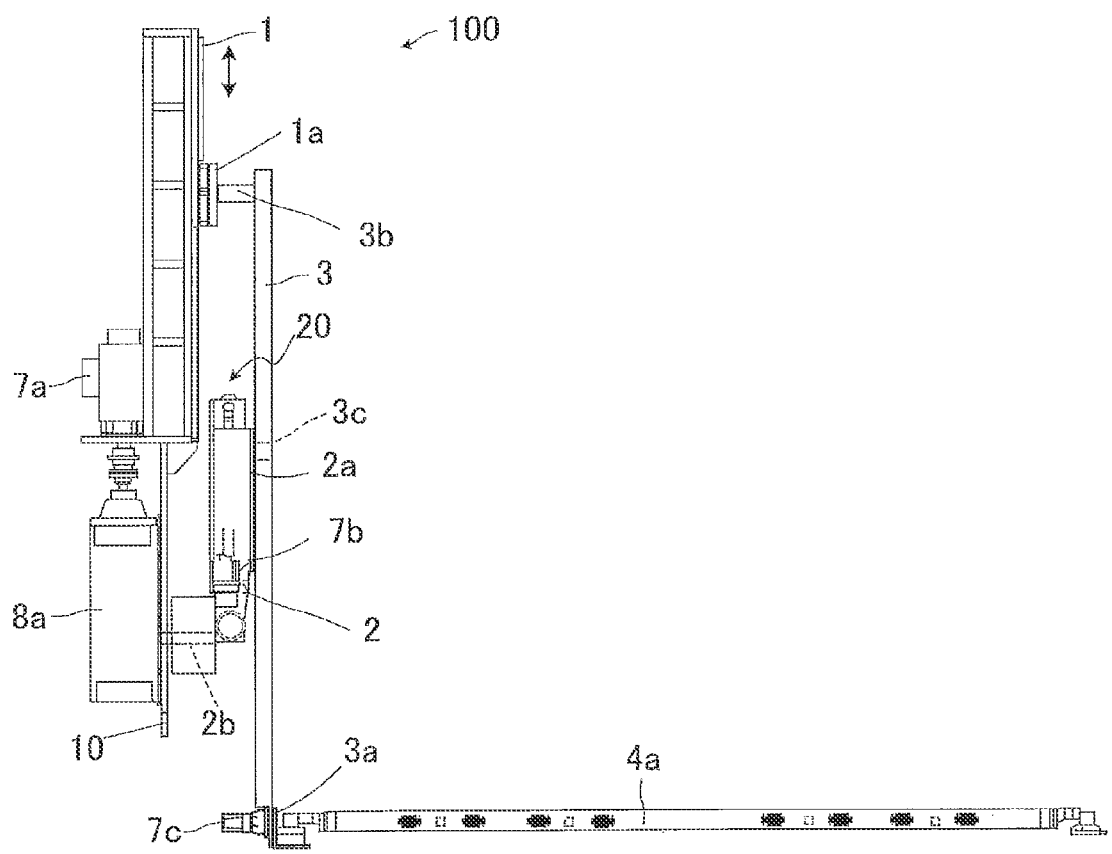
FIG. 2 is a side view showing one ample of a workpiece conveying device according to the present embodiment.

FIG. 2 is a side view showing one example of a workpiece conveying device according to the present embodiment.

As shown in FIG. 2, in the workpiece conveying device 100, a servomotor (hereinafter referred to as "first servomotor" for the sake of convenience) 7a and a reduction gear 8a coupled to the first servomotor are mounted to the rear surface of the rail portion 1. Therefore, by suitably selecting reduction ratios, the first servomotor 7a can suppress torque of a motor shaft.

Here, the auxiliary arm 20 rotates around the first shaft 2b provided at the main body portion 10. Further, the first servomotor 7a is coupled to the first shaft 2b via the reduction gear 8a. Therefore, the auxiliary arm 20 is arranged to rotate around the first shaft 2b of the main body portion 10 as indicated by arrow A based on driving of the first servomotor 7a.

Returning to FIG. 1, the main body portion 10 is arranged to be mounted to a post of a press machine as it will be described later. Namely, the workpiece conveying device 100 can be mounted to a post P1 of a press machine via the main body portion 10 (see FIG. 5).

The arm 3 is pivotally attached to the guide portion 1a at its upper end by means of the first pivotally attaching portion 3b and is made to rotate largely around the first pivotally attaching portion 3b.

Further, approximately the center of the arm 3 is pivotally attached to the slider portion 2a by means of the second pivotally attaching portion 3c.

Moreover, the holding means 4 capable of holding a workpiece W is mounted to the second shaft 3a at the lower end of the arm 3.

Here, the second pivotally attaching portion 3c is provided to lean closer to the first pivotally attaching portion 3b side (guide portion 1a side) than the central portion with respect to the longitudinal direction of the arm 3. With this arrangement, the length of the auxiliary arm 20 can be reduced, and the device can be made more compact.

At this time, it is preferable that the ratio of the distance H1 from the first pivotally attaching portion 3b to the second pivotally attaching portion 3c and the distance H2 from the second shaft 3a to the second pivotally attaching portion 3c (H1:H2) is 1:1.2 to 2. In this case, the device can be made more compact, and it is also possible to reduce energy costs necessary for conveyance.

Further, it is preferable that the ratio of the distance H3 from the first shaft 2b to the second pivotally attaching portion 3c and the distance (H1+H2) from the first pivotally attaching portion 3b to the second shaft 3b (H3:H1+H2) is 1:2 to 4. In this case, the size of the device can be made more compact.

The holding means 4 comprises the crossbar 4a coupled to the second shaft 3a at the lower end of the arm and a plurality of suction portions 4b mounted to the crossbar 4a. Therefore, it is possible to suck and hold a workpiece W also in case of a relatively large workpiece W.

Figure 3:
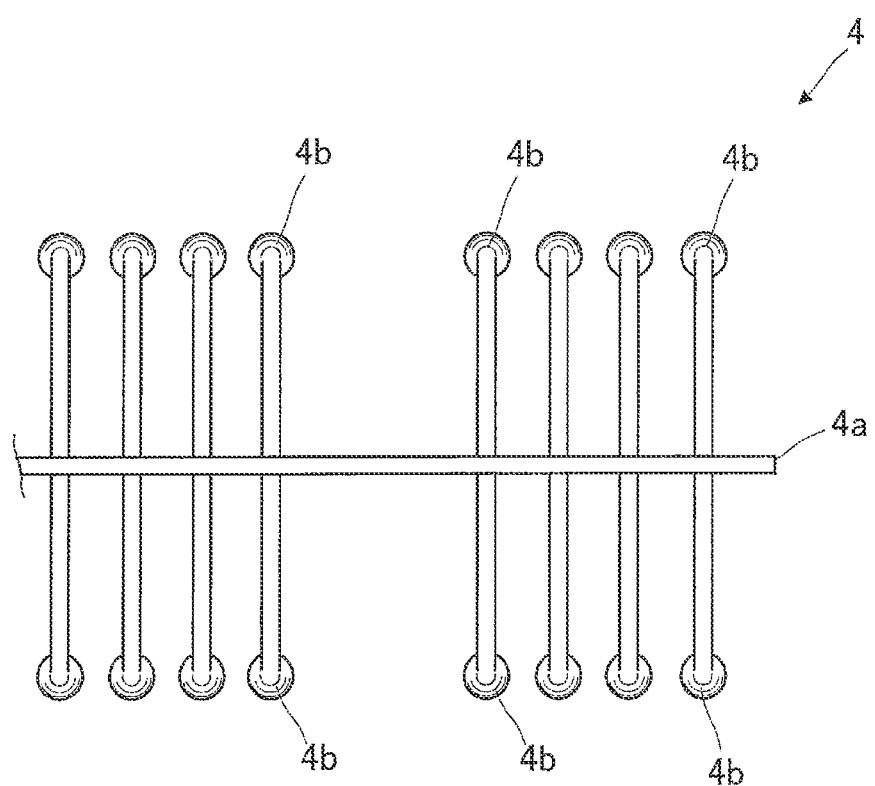
FIG. 3 is a schematic top view showing a holding means in the workpiece conveying device according to the present embodiment.

FIG. 3 is a top view showing the holding means in the workpiece conveying device according to the present embodiment.

As shown in FIG. 3, the suction portions 4b each comprised of a pair of right and left vacuum cups are mounted at eight spots of the crossbar 4a in the holding means 4.

Each of the suction portions 4b sucks and holds a planar portion of a workpiece W by sucking its interior. In this respect, it is also possible that each of the suction portions 4b sucks and holds the workpiece W independently from each other. In this case, it is possible to suitably select suction portions 4b to be used depending on shapes and sizes of workpieces W.

In the holding means 4, a servomotor 7c (hereinafter referred to as "second servomotor" for the sake of convenience) is coupled to the second shaft 3a (see FIG. 2).

Accordingly, the crossbar 4a is made to rotate based on driving of the second servomotor 7c. In this respect, the crossbar 4a rotates with the suction portions 4b continuously facing directly downward corresponding to the position of the rotating arm 3.

Figure 4:
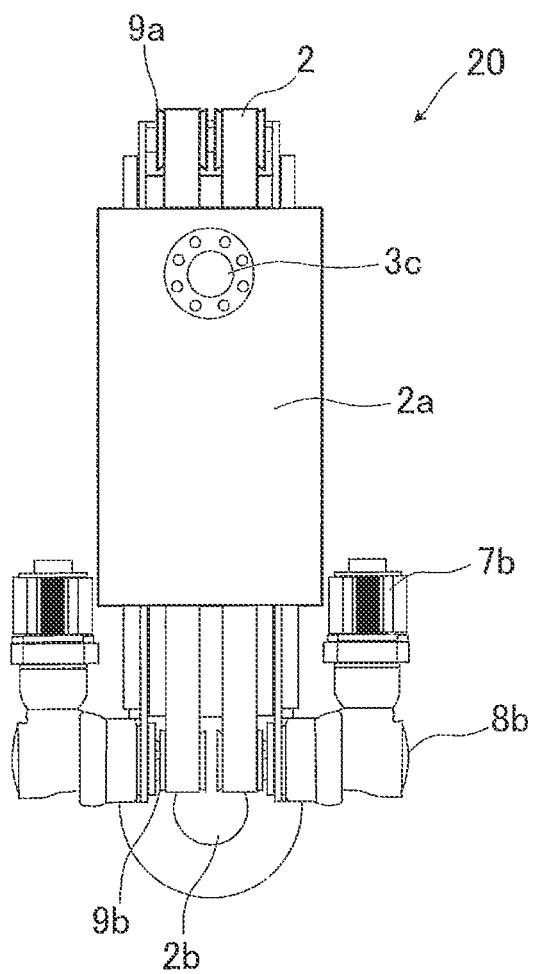
FIG. 4 is an enlarged front view showing an auxiliary arm in the workpiece conveying device according to the present embodiment.

FIG. 4 is an enlarged front view showing the auxiliary arm in the workpiece conveying device according to the present embodiment.

As shown in FIG. 4, in the workpiece conveying device 100, the belt portion 2 which slides along the longitudinal direction of the auxiliary arm 20 is extended at the auxiliary arm 20, and the slider portion 2a is fixed at the belt portion 2.

More specifically, at the auxiliary arm 20, the belt portion 2 is extended in the longitudinal direction via a follower pulley 9a and a drive pulley 9b, and the slider portion 2a is fixed to the belt portion 2.

Further, a servomotor 7b (hereinafter referred to as "third servomotor" for the sake of convenience) for driving the follower pulley 9b is mounted to the auxiliary arm 20 via a reduction gear 8b. Therefore, by suitably selecting reduction ratios, the third servomotor 7b can suppress torque of the motor shaft.

In the auxiliary arm 20, the drive pulley 9b moves based on driving of the third servomotor 7b, and the belt portion 2 slides along the longitudinal direction of the auxiliary arm 20.

At this time, since the slider portion 2a is fixed to the belt portion 2, the slider portion 2a will also slide along the longitudinal direction of the auxiliary arm 20 integrally with the belt portion 2. In this respect, the arm 3 is pivotally attached to the slider portion 2a by means of the second pivotally attaching portion 3c as described above.

In the workpiece conveying device 100, the arm 3 rotates at the first pivotally attaching portion 3b, through the cooperation of the first servomotor 7a for driving the auxiliary arm 20 and the third servomotor 7b for driving the slider portion 2a.

In the workpiece conveying device 100, by sliding the slider portion 2a pivotally attached to the arm 3 along the auxiliary arm 20 mounted to the main body portion 10 in a rotatable manner, the auxiliary arm 20 supports the arm 3 via the slider portion 2a while it does not interfere linear conveyance of the workpiece W. With this arrangement, it is possible to linearly convey also a workpiece W of relatively large weight as it will be described later.

In the workpiece conveying device 100, since all of rotation of the holding means 4, rotation of the auxiliary arm 20 and sliding of the slider portion 2a is performed by driving the servomotors as described above, the configuration does not require space and be even simpler.

The workpiece conveying device 100 according to the present embodiment is preferably used, for instance, as a device for carrying a workpiece in and out with respect to a press machine and which is mounted to a post of the press machine.

Figure 5:
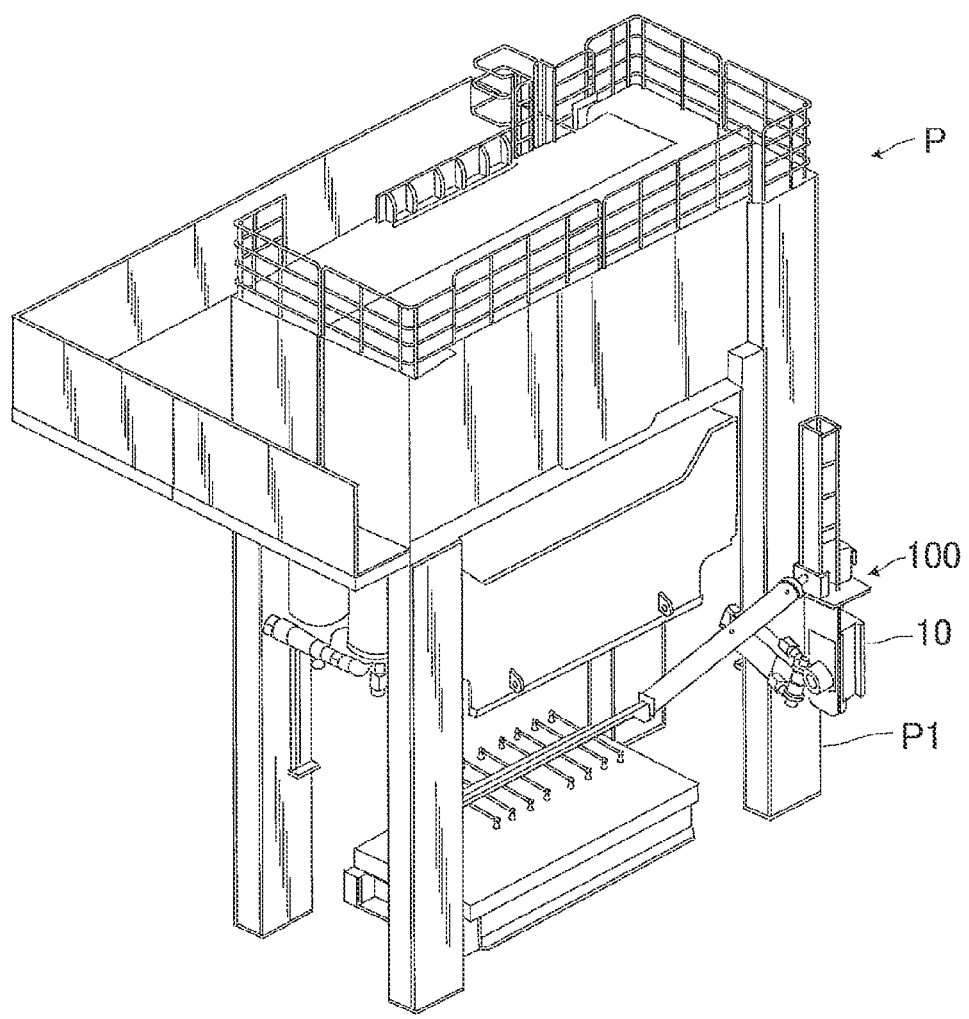
FIG. 5 is a schematic perspective view showing a press machine to which the workpiece conveying device according to the present embodiment is mounted.

FIG. 5 is a schematic perspective view showing a press machine to which the workpiece conveying device according to the present embodiment is mounted. In this respect, detailed portions of the press machine will be omitted.

As shown in FIG. 5, the press machine P is arranged in that the main body portion 10 of the workpiece conveying device 100 is mounted to a post P1. Namely, since the workpiece conveying device 100 according to the present embodiment is of light-weight and simple configuration and is space-saving, it can be installed in a small space.

In the press machine P, a workpiece after pressing is carried out by the workpiece conveying device 100. In this respect, it is, of course, also possible to carry a workpiece in before pressing into the press machine.

For instance, also in case a plurality of press machines P is aligned to comprise a tandem press line, the workpiece conveying devices 100 will not require large spaces and the entire line can be made compact.

Moreover, as described above, since the workpiece conveying device 100 can convey a workpiece linearly, it is possible to carry the workpiece in and out quickly and efficiently in the press machine P.

Next, a workpiece conveying method using the workpiece conveying device 100 will be explained.

FIGS. 6(a) to FIG. 6(f) are explanatory views for explaining tracks of the lower end (base portion of the second shaft 3a) of the arm when a workpiece is conveyed using the workpiece conveying device according to the present embodiment. In this respect, detailed descriptions of the holding means 4 are omitted for the sake of convenience.

Figure 6A:
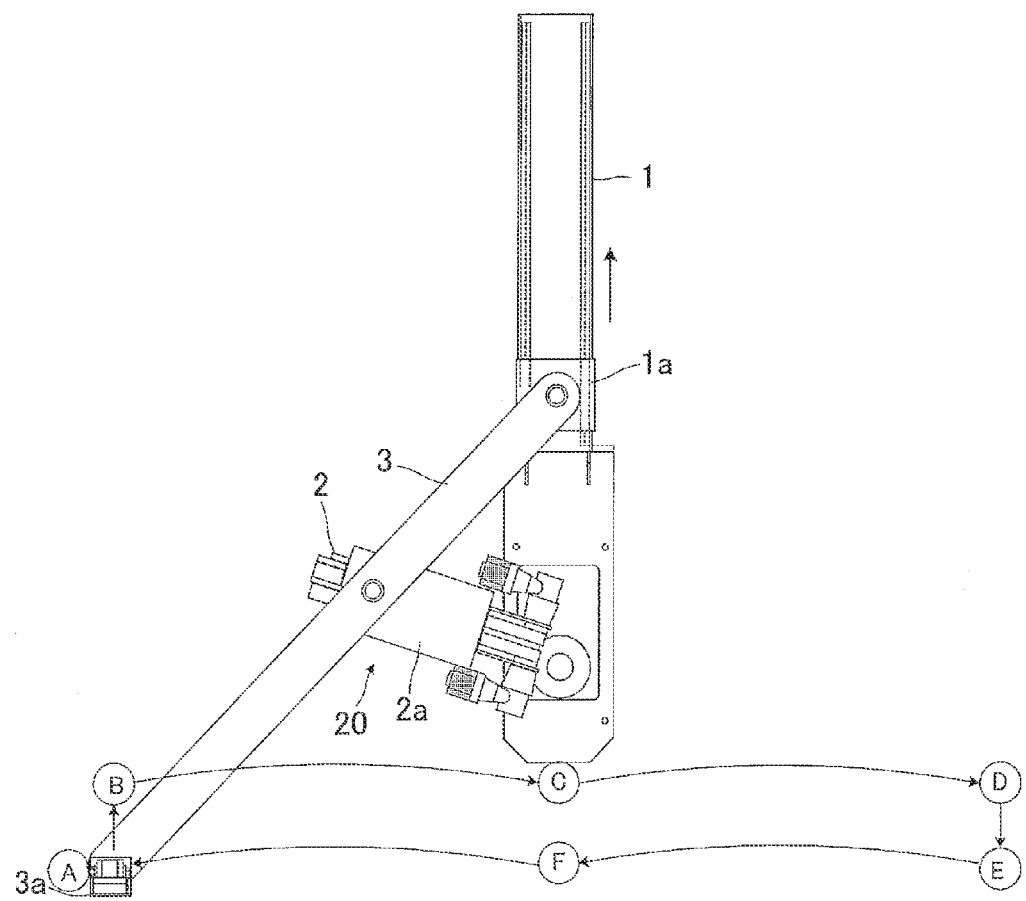
FIG. 6(a) is an explanatory view for explaining a track of a second shaft at a lower end of an arm when a workpiece is conveyed using the workpiece conveying device according to the present embodiment.

As shown in FIG. 6(a), the lower end of the arm 3 holds a workpiece (not shown) at position A via the holding means. At this time, the guide portion 1a is positioned on the lowermost side of the rail portion 1 and the slider portion 2a is positioned closer to the upper side of the auxiliary arm 20.

Figure 6B:
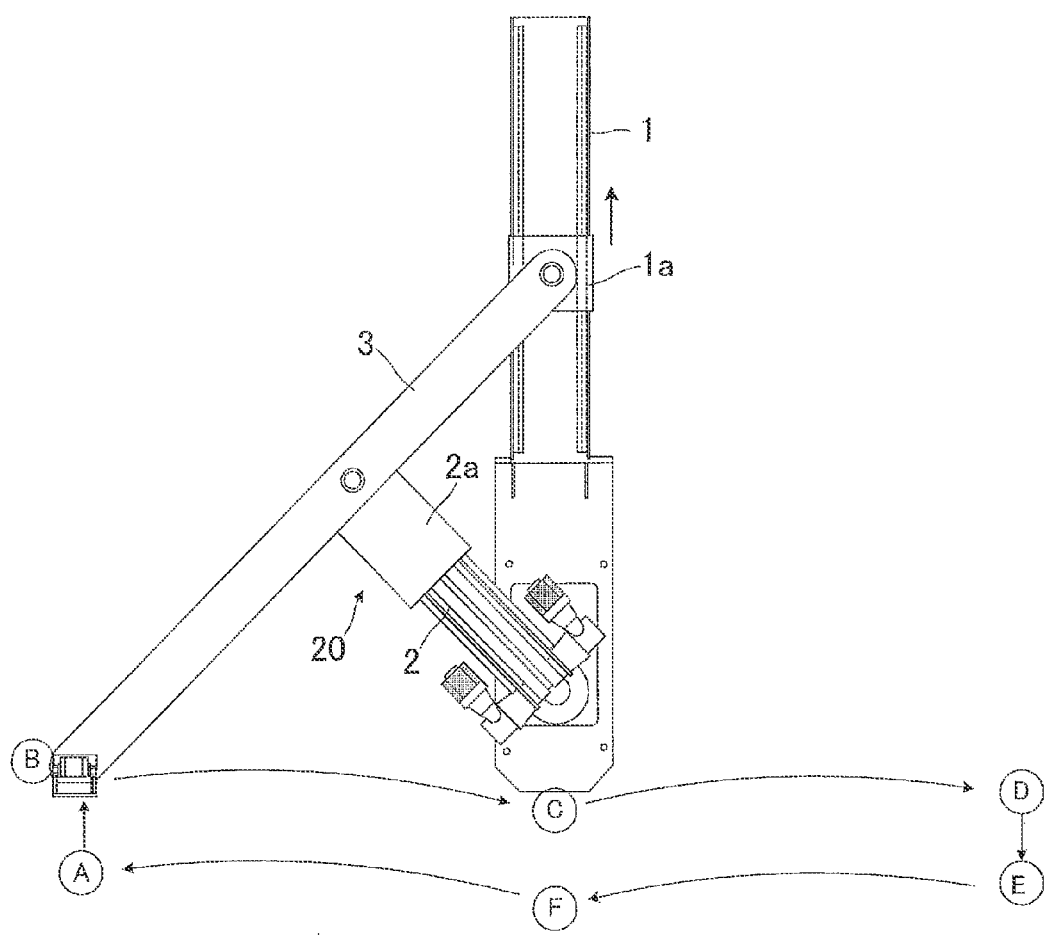
FIG. 6(b) is an explanatory view for explaining a track of the second shaft at the lower end of an arm when a workpiece is conveyed using the workpiece conveying device according to the present embodiment.

Then, the guide portion 1a is moved upward up to approximately the center of the rail portion 1 and the slider portion 2a is moved to the uppermost side of the auxiliary arm 20. Then, the arm 3 will move upward while maintaining a predetermined angle as shown in FIG. 6(b) and the lower end of the arm 3 reaches position B. With this arrangement, the workpiece (not shown) is lifted up.

Figure 6C:
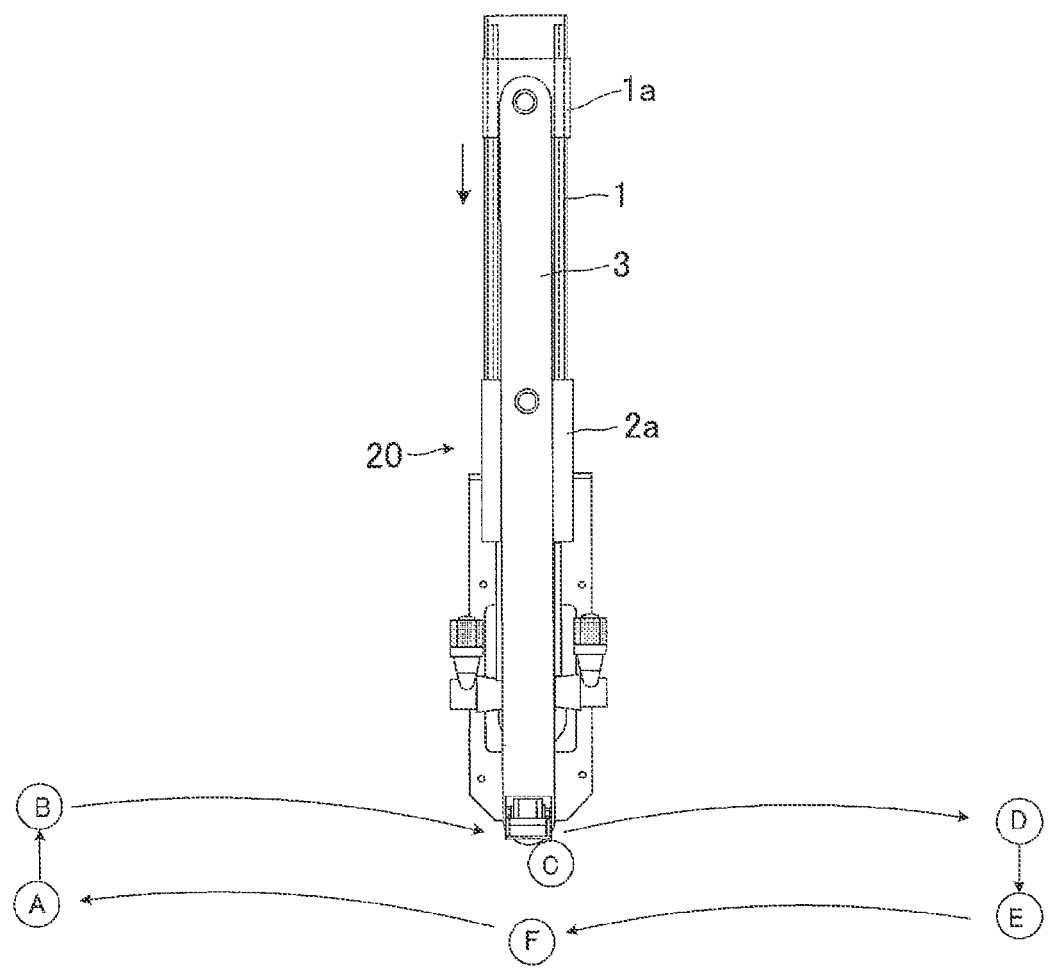
FIG. 6(c) is an explanatory view for explaining a track of the second shaft at the lower end of an arm when a workpiece is conveyed using the workpiece conveying device according to the present embodiment.

Next, the slider portion 2a maintains the state in which it is at the uppermost position of the auxiliary arm 20 and the guide portion 1a is moved to the uppermost side of the rail portion 1. Then, the arm 3 and the auxiliary arm 20 rotate to be aligned on the same line as shown in FIG. 6(c). Consequently, the lower end of the arm 3 moves rightward and reaches position C. At this time, the guide portion 1a, the rail portion 1, the slider portion 2a, the auxiliary arm 20 and the arm 3 will overlap on the same line.

Figure 6D:
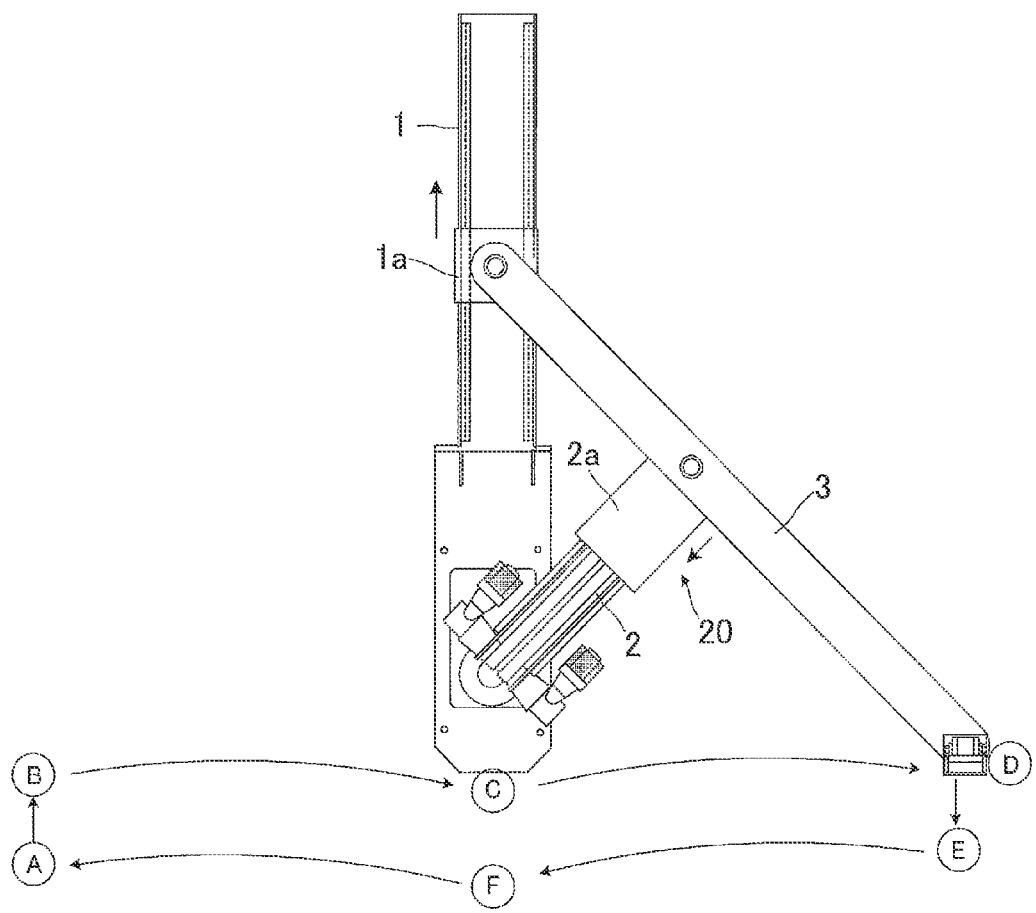
FIG. 6(d) is an explanatory view for explaining a track of the second shaft at the lower end of an arm when a workpiece is conveyed using the workpiece conveying device according to the present embodiment.

Next, the slider portion 2a maintains the state in which it is at the uppermost position of the auxiliary arm 20 and the guide portion 1a is moved downward up to approximately the center of the rail portion 1. Then, the arm 3 and the auxiliary arm 20 rotate as shown in FIG. 6(d) and the lower end of the arm 3 moves further rightward and reaches position D.

Figure 6E:
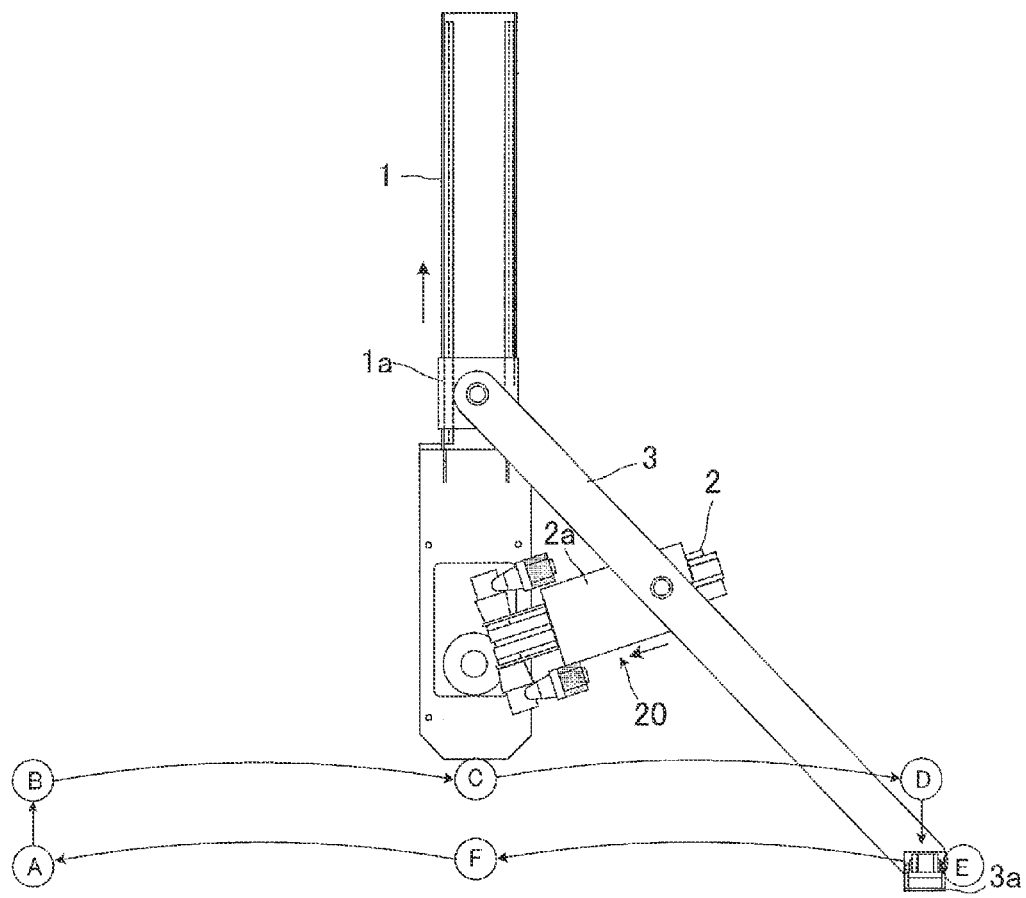
FIG. 6(e) is an explanatory view for explaining a track of the second shaft at the lower end of an arm when a workpiece is conveyed using the workpiece conveying device according to the present embodiment.

Next, the guide portion 1a is moved to the lowermost side of the rail portion 1 and the slider portion 2a is moved to a position closer to the upper side of the auxiliary arm 20 from the uppermost position of the auxiliary arm 20. Then, the arm 3 moves downward in a state in which it maintains the predetermined angle as shown in FIG. 6(e) and the lower end of the arm 3 reaches position E. Holding of the workpiece (not shown) is then released via the holding means 4.

Conveyance of a workpiece is performed in this manner.

Figure 6F:
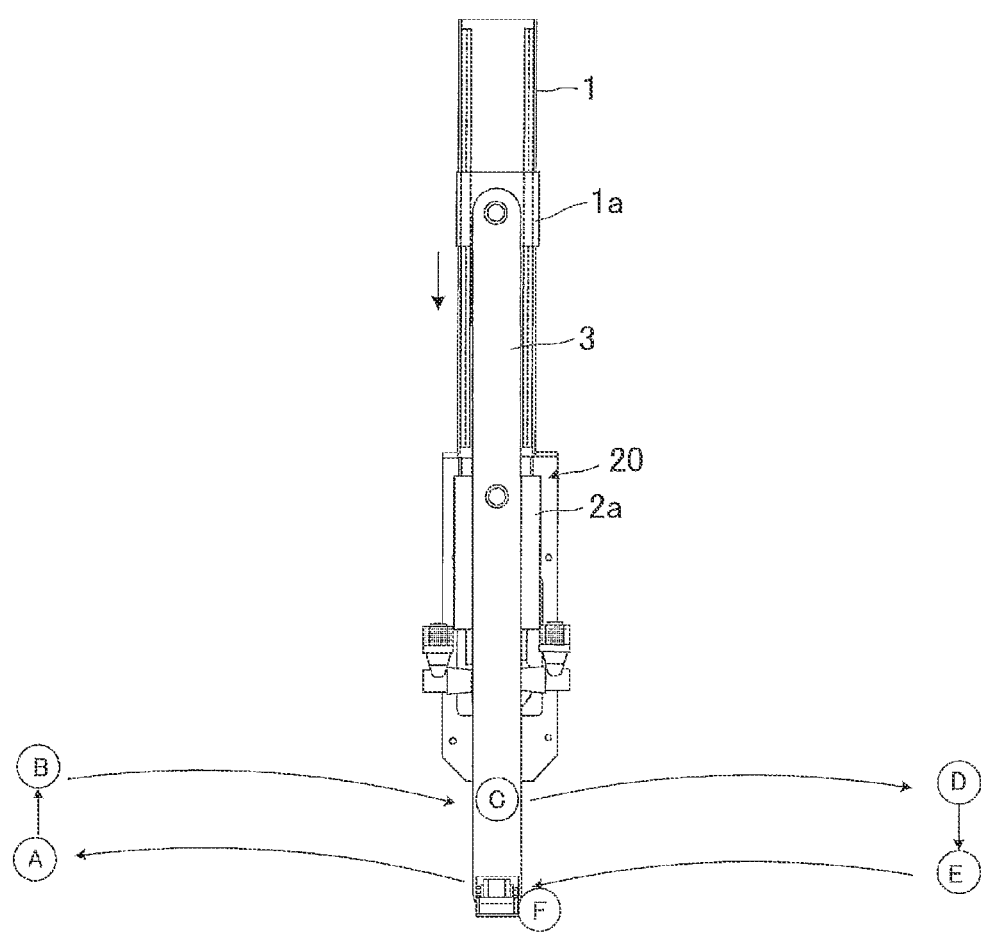
FIG. 6(f) is an explanatory view for explaining a track of the second shaft at the lower end of an arm when a workpiece is conveyed using the workpiece conveying device according to the present embodiment.

In this respect, after conveying the workpiece, the guide portion 1a is moved to approximately center of the rail portion 1 and the slider portion 2a is moved to the lowermost side of the auxiliary arm 20. Then, the arm 3 and the auxiliary arm 20 rotate as shown in FIG. 6(f) and the lower end of the arm 3 moves leftward and reaches position F. At this time, the guide portion 1a, the rail portion 1, the slider portion 2a, the auxiliary arm 20 and the arm 3 will repeatedly be overlapped on the same line.

Then, the guide portion 1a is moved to the lowermost side of the rail portion 1 and the slider portion 2a is moved from the lowermost position of the auxiliary arm 20 to a position closer to the upper side of the auxiliary arm 20. Then, the arm 3 and the auxiliary arm 20 rotate, the second shaft 3a moves leftward, and the lower end of the arm 3 reaches the position A as shown in FIG. 6(a).

In the workpiece conveying method using the workpiece conveying device 100, it is possible to linearly convey a workpiece by sliding the guide portion 1a pivotally attached to the arm 3 along the rail portion 1 on one hand and by sliding the slider portion 2a pivotally attached to the arm 3 along the auxiliary arm 20 on the other hand.

When a workpiece is sucked and held, the workpiece can be linearly conveyed in the lateral direction in a state in which it is lifted upward, and when no workpiece is sucked and held, the second shaft 3a at the lower end of the arm 3 can be moved linearly in the lateral direction without moving it upward. Namely, it is possible to move the second shaft 3a in the lateral direction via two types of paths.

While a preferred embodiment of the present invention has been explained above, the present invention is not to be limited to the above embodiment.

For instance, while the holding means 4 comprising the crossbar 4a connected to the second shaft 3a at the lower end of the arm 3 and suction portions 4b mounted to the crossbar 4a is used as a means which holds a workpiece W in the workpiece conveying device 100 according to the present embodiment, the present invention is not limited to this, and it is also possible to employ a gripper or the like.

Further, while suction portions 4b comprised of a pair of right and left vacuum cups are mounted to the crossbar 4a at eight spots, spots and numbers of mounting the suction portions 4b are not limited to this.

While one end of the crossbar 4a is coupled to the second shaft 3a at the lower end of the arm 3 in the workpiece conveying device 100 according to the present embodiment, it is also possible that a pair of workpiece conveying devices 100 is coupled to both ends of the crossbar. Namely, it is also possible that a pair of workpiece conveying devices 100 is coupled via the crossbar.

While the slider portion 2a is mounted to the auxiliary arm 20 via the belt portion 2 in the workpiece conveying device 100 according to the present embodiment, the present invention is not limited to this configuration.

For instance, it is also possible to provide a rail at the auxiliary arm 20 and to make the slider portion slide along this rail or to move the slider itself using wires or the like.

While all of rotation of the holding means 4, rotation of the auxiliary arm 20 and the sliding of the slider portion 2a is performed through driving servomotors in the workpiece conveying device 100 according to the present embodiment, the present invention is not limited to this, and it might also be driving using invertor motors or the like.

On the other hand, it is also possible to perform sliding of the guide portion 1a by driving a servomotor instead of rotation of the auxiliary arm 20.

In the workpiece conveying device 100 according to the present embodiment, mounting of the reduction gears to the first servomotor, the second servomotor and the third servomotor is arbitrary.

INDUSTRIAL APPLICABILITY

The workpiece conveying device according to the present invention is preferably used as a workpiece conveying device for conveying a workpiece used, for instance, for press working.

According to the workpiece conveying device according to the present invention, a workpiece can be conveyed linearly with a light-weight and simple configuration.

REFERENCE SIGNS LIST

1 . . . rail portion,
1a . . . guide portion,
2 . . . belt portion,
2a . . . slider portion,
2b . . . first shaft,
3 . . . arm,
3a . . . second shaft,
3b . . . first pivotally attaching portion,
3c . . . second pivotally attaching portion,
4 . . . holding means,
4a . . . crossbar,
4b . . . suction portion,
7a . . . first servomotor (servomotor),
7b . . . third servomotor (servomotor),
7c . . . second servomotor (servomotor),
8a, 8b . . . reduction gear,
9a . . . follower pulley,
9b . . . drive
10 . . . main body portion,
20 . . . auxiliary arm,
100 . . . workpiece conveying device,
P . . . press machine,
P1 . . . post,
W . . . workpiece,

The invention claimed is:

1. A workpiece conveying device for conveying a workpiece, comprising:
   a main body portion;
   a rail portion provided to extend at an upper portion of the main body portion;
   a guide portion slidable along the rail portion;
   an arm which upper end is pivotally attached to the guide portion by a first pivotally attaching portion;
   a holding means which is mounted to an arm lower-end shaft at a lower end of the arm and which can hold the workpiece;
   an auxiliary arm mounted to a main body shaft of the main body portion to be rotatable; and
   a slider portion slidable along the auxiliary arm,
   wherein the arm is a single arm, and approximately middle of the arm is pivotally mounted to the slider portion by a second pivotally attaching portion,
   the second pivotally attaching portion is provided closer to the first pivotally attaching portion side than a center position with respect to a longitudinal direction of the arm,
   the slider portion is attached to the auxiliary arm via a sliding belt portion, and
   rotation of the auxiliary arm, rotation of the holding means, and sliding of the slider portion are performed by driving a first servo motor, a second servo motor, and a third servo motor, respectively.

2. The workpiece conveying device according to claim 1, wherein a ratio of a distance from the first pivotally attaching portion to the second pivotally attaching portion and a distance from the arm lower-end shaft to the second pivotally attaching portion is 1:1.2 to 2.

3. The workpiece conveying device according to claim 1, wherein a ratio of a distance from the main body shaft to the second pivotally attaching portion and a distance from the first pivotally attaching portion to the arm lower-end shaft is 1:2 to 4.

4. The workpiece conveying device according to claim 1, wherein the holding means is comprised of a crossbar connected to the arm and suction portions mounted to the crossbar.

5. The workpiece conveying device according to claim 1 which is used as a device carrying a workpiece in and out with respect to a press machine and which is mounted to a post of the press machine.

\* \* \* \* \*